(12) United States Patent     (10) Patent No.:    US 8,861,477 B1
Goyal et al.                                     (45) Date of Patent:      Oct. 14, 2014

(54) SELECTING A TARGET BASE STATION BASED ON CONGESTION LEVELS OF INTER-BASE-STATION LINKS

(71) Applicant: Sprint Spectrum L.P., Overland Park, KS (US)

(72) Inventors: Anoop K. Goyal, Overland Park, KS (US); Siddharth S. Oroskar, Overland Park, KS (US); Sachin R. Vargantwar, Macon, GA (US)

(73) Assignee: Sprint Spectrum L.P., Overland Park, KS (US)

( * ) Notice: Subject to any disclaimer, the term of this patent is extended or adjusted under 35 U.S.C. 154(b) by 14 days.

(21) Appl. No.: 13/633,266

(22) Filed: Oct. 2, 2012

(51) Int. Cl.
*H04W 36/22* (2009.01)
*H04W 36/08* (2009.01)

(52) U.S. Cl.
USPC .......................................................... 370/331

(58) Field of Classification Search
CPC .. H04B 7/0408; H04B 7/0491; H04B 7/0615; H04B 7/0897; H04B 7/2696; H04J 3/0652; H04L 1/18; H04W 36/0055; H04W 36/02; H04W 36/12; H04W 36/18; H04W 40/36; H04W 52/286; H04W 72/042; H04W 72/12
USPC ............................ 370/254–350; 709/201–213
See application file for complete search history.

(56) References Cited

U.S. PATENT DOCUMENTS

| | | | |
|---|---|---|---|
| 6,463,285 B1 * | 10/2002 | Davies et al. .................. | 455/436 |
| 6,603,971 B1 | 8/2003 | Mohebbi | |
| 6,901,257 B2 * | 5/2005 | Kubota ........................... | 455/439 |
| 6,944,462 B2 | 9/2005 | Riihinen et al. | |
| 7,076,214 B2 | 7/2006 | Jabbary | |
| 7,155,236 B2 * | 12/2006 | Chen et al. ..................... | 455/454 |
| 2011/0002304 A1 * | 1/2011 | Lee et al. ........................ | 370/331 |
| 2012/0063417 A1 | 3/2012 | Redana et al. | |

OTHER PUBLICATIONS

Application of Sachin R. Vargantwar, et al., Method and System for Managing Handoff in a Radio Access Network, U.S. Appl. No. 12/414,934, filed Mar. 31, 2009 (U.S. Patent No. 8,254,331, issued Aug. 28, 2012).

Palat, Sudeep and Godin, Philippe, Alcatel-Lucent Strategic White Paper, The LTE Network Architecture, A Comprehensive Tutorial, 2009.

Sesia, Stefania, Toufik, Issam, and Baker, Matthew, LTE-The UMTS Long Term Evolution, From Theory to Practice, John Wiley and Sons, Ltd., 2009.

* cited by examiner

*Primary Examiner* — Ayaz Sheikh
*Assistant Examiner* — Debebe Asefa

(57) ABSTRACT

Described are various approaches for considering inter-base-station link congestion levels in connection with handoff of a mobile station when the source base station (or another entity) is able to select a target base station for handoff from among a plurality of base stations. In one aspect, the plurality of base stations are each communicatively linked via a respective inter-base-station link with the source base station serving the mobile station. The source base station (or another entity) selects the target base station from among the plurality of base stations based at least in part on a congestion level of each base station's respective inter-base-station link. The source base station then hands off the mobile station to the target base station.

14 Claims, 6 Drawing Sheets

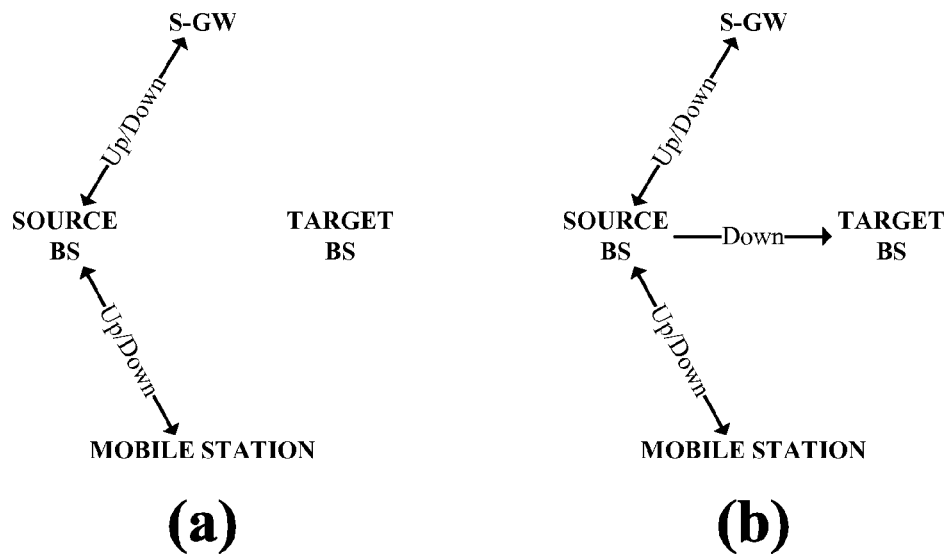
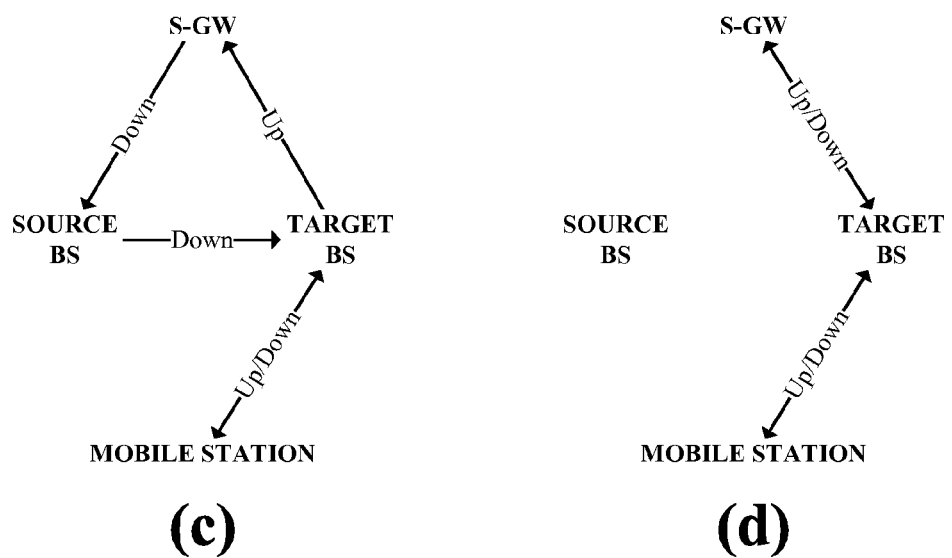
Fig. 3

SELECTING A TARGET BASE STATION BASED ON CONGESTION LEVELS OF INTER-BASE-STATION LINKS

BACKGROUND

A typical cellular radio access system includes a radio access network (RAN) that is arranged to provide mobile stations with access to one or more transport networks such as the public switched telephone network (PSTN) and/or the Internet. In an example, the RAN includes a cellular base station (e.g., base transceiver station, access node, eNodeB, or the like), which may include an antenna configuration and associated equipment for radiating to define one or more coverage areas in which a mobile station can wirelessly communicate with the base station over an air interface. The base station may operate according to a defined air-interface protocol such as CDMA, LTE, WiMAX, and/or GSM, and the mobile station may operate according to the same air-interface protocol to enable and facilitate communicating with the base station and gaining access to one or more transport networks via the RAN.

The cellular radio access system may further include various entities such as switches, gateways, and controllers that may facilitate connectivity with a transport network and/or may help control aspects of RAN operation such as registration and de-registration of mobile stations. In an example, the cellular radio access system may include a mobile switching center (MSC), a mobility management entity (MME), a softswitch, a media gateway controller (MGC), a packet data serving node (PDSN), a serving gateway (S-GW), and a packet data network gateway (P-GW). Further, these entities may be coupled with a signaling network to facilitate communication with other system entities such as a home location register (HLR) (e.g., a home subscriber server (HSS)) or a location-determination system, among other entities.

An HLR may function to store service-profile records for mobile stations that subscribe to service from the cellular radio access system. For each respective mobile station, the service-profile record (e.g., a UE context) may indicate services that the RAN is to provide for the mobile station. Further, the HLR may keep track of which portion of the cellular radio access system is serving the mobile station at any given time, so as to facilitate routing of calls or other communications to the mobile station. For instance, the HLR may maintain for each mobile station a record of the base station, switch, gateway or other node currently serving the mobile station, or last known to be serving the mobile station. When an entity seeks to route a communication to the mobile station, the entity may thus query the HLR to identify the base station that is currently serving the mobile station and may then route the communication to that base station for wireless transmission to the mobile station over an air interface.

Base stations in the cellular radio access system may be arranged to broadcast in each of their coverage areas a respective pilot signal (or reference signal), which may enable mobile stations to select an appropriate coverage area in which to operate. The mobile stations may correspondingly scan for these pilot signals and attempt to register in a coverage area that is broadcasting a sufficiently strong signal.

In practice, when a mobile station enters into coverage of the RAN, such as coverage of a base station, the mobile station may engage in a registration (e.g., attach) procedure so as to then be able to engage in bearer-data communication, perhaps to place and receive calls and engage in wireless packet-data communication, to the extent that the mobile station's service profile and capabilities allow, perhaps. During the registration procedure, the mobile station may transmit a radio-access-registration-request (e.g., attach-request) message via an air-interface uplink channel to the base station providing the coverage area. Upon receiving that registration-request message, the base station may signal to one or more other entities of the cellular radio access system, such as an MSC or MME as examples, which in turn may signal to the HLR.

As a result of this signaling, the mobile station may be authenticated and its service subscription verified, and the HLR may receive an update (from the base station or other entity) indicating where in the network the mobile station is located. Further, one or more entities may facilitate the setup of a bearer-data communication channel for the mobile station, and the HLR may provide the base station, MSC, MME, or the like with a copy of the mobile station's service profile for local storage, which may then be used to facilitate serving the mobile station. The base station may then transmit to the mobile station over an air interface downlink channel a registration-response (e.g., attached-accept) message, acknowledging the registration. Once registered, the mobile station may engage in bearer-data communication in accordance with the mobile station's service profile and capabilities.

After initially registering in a coverage area, a mobile station may continue to monitor the pilot signal of that coverage area as well as the pilot signals of adjacent coverage areas, and may at some point transmit to the serving base station a radio measurement report (e.g., pilot-strength-measurement message or data-rate-control message) indicating the strength of the monitored signals. If the base station determines based on such a message that an adjacent coverage area provides sufficiently stronger coverage than the currently serving coverage area, the base station may arrange for a handoff of the mobile station to the adjacent coverage area.

To initiate a handoff of a mobile station to a target base station, a source base station may send a handover-request message to the target base station, which in turn may accept the handoff request by sending a handover-request-acknowledgment message to the source base station. Upon receiving the handover-request-acknowledgment message, the source base station may send to the mobile station a handoff-direction message, indicating to the mobile station that subsequent air-interface communication should be conducted via the target-base-station coverage area. The source base station may also send to the target base station via an inter-base-station link (e.g., an X2 link) between the source and target base stations a locally-stored service profile of the mobile station, which the target base station may require before serving the mobile station. Further, the source base station may forward downstream bearer data to the target base station via the inter-base-station link until the source base station receives a release-resource message (described below) from the target base station. The forwarded data can then be sent to the mobile station once it begins operating on the target-base-station coverage area.

Upon receiving a handover-complete message from the mobile station and receiving the service profile from the source base station, the target base station may send a path-switch-request message to an S-GW to request that downstream bearer data destined for the mobile station be directed to the target base station (rather than to the source base station). The target base station, upon receiving a path-switch-request-acknowledgement message from the S-GW, indicating that downstream bearer data has been redirected to the target base station, may then send a resource-release message to the source base station, indicating that the source base station may release any resources still allocated to the mobile station.

OVERVIEW

Congestion of an inter-base-station link or other link generally results from transmitting data over the link at a rate that exceeds the link's capacity, and generally causes performance degradation over at least that link. A congestion level may be measured by the degree of this performance degradation, such as the rate of dropped packets, packet-delivery errors, and/or out-of-order packet deliveries (in the case of packet switching), among other examples.

Performance degradation on an inter-base-station link is especially undesirable during (or otherwise in connection with) a handoff of a mobile station. One handoff-related subtask that illustrates this is the providing of a service profile from the source base station to the target base station. In general, this practice tends to shorten handoff time by precluding the target base station from having to request the service profile from a network entity such as an HLR. Attempting this over a congested inter-base-station link may be delayed and even ultimately unsuccessful, however, perhaps requiring the target base station to then request the service profile from the HLR, increasing the total handoff time. Moreover, such congestion may slow or prevent transmission of downstream bearer data from the source base station to the target base station for delivery to the mobile station, resulting in poor call quality during the handoff.

Described herein are various approaches for considering inter-base-station link congestion levels during handoff of a mobile station when the source base station (or another entity) is able to select a target base station for handoff from among two or more base stations.

In one aspect, a plurality of first base stations are each communicatively linked via a respective inter-base-station link with a source base station that itself is serving a mobile station. The source base station or another entity selects a target base station from among the first base stations based at least in part on a congestion level of each first base station's respective inter-base-station link with the source base station, which then hands off the mobile station to the selected target base station. The congestion level could be a throughput, a latency, and/or a jitter, instead of or in addition to other possibilities, such as the congestion metrics listed above. The respective inter-base-station link could be a link-layer link (such as an X2 link), an Internet-layer link, a transport-layer link, a radio network-layer link, or an application-layer link, as examples.

In another aspect, each of the first base stations is communicatively linked with the source base station via a respective backhaul link (in addition to the respective inter-base-station links), and the target base station is selected based on the congestion levels of each first base station's respective inter-base-station and backhaul links. In yet another aspect, the inter-base-station links comprise at least one inter-base-station link segment, and the target base station is selected based at least in part on a congestion level of at least one such segment.

In still another aspect, handing off the mobile station to the target base station comprises the source base station sending (i) a service profile of the mobile station and/or (ii) downstream bearer data to the target base station via the target base station's respective inter-base-station link with the source base station, and the target base station in turn sending any received downstream bearer data to the mobile station.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended by way of example and not limitation.

BRIEF DESCRIPTION OF THE DRAWINGS

Various example embodiments are described herein with reference to the following drawings, in which like numerals denote like entities, and in which:

FIG. 3 depicts upstream and downstream bearer data paths, in accordance with at least one embodiment;

DETAILED DESCRIPTION OF THE DRAWINGS

I. Introduction

The present systems and methods will now be described with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

II. Example Network

Figure 1:
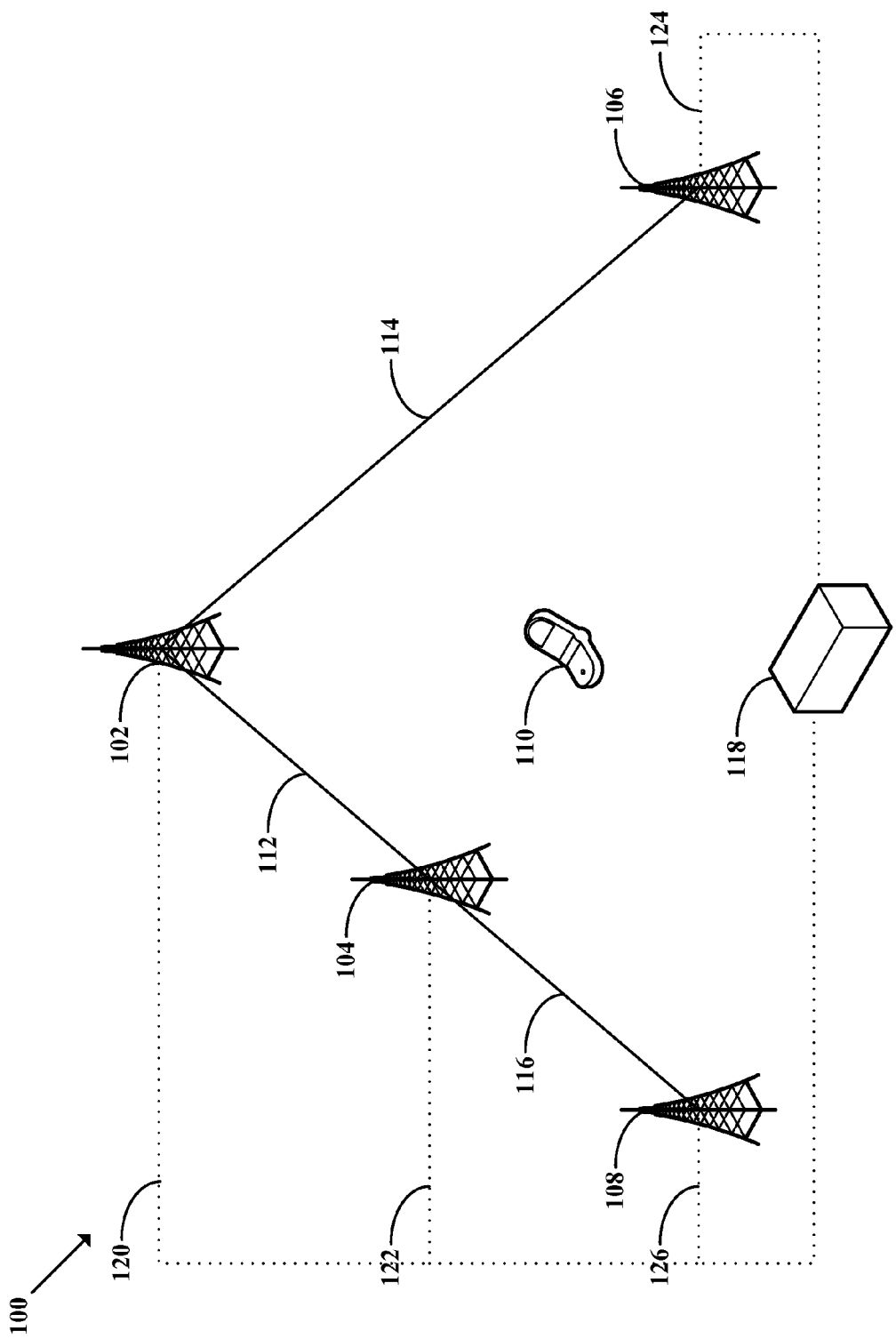
FIG. 1 depicts a wireless communication network in which at least one embodiment could be carried out.

As shown in FIG. 1, cellular radio access system 100 includes source base station 102 initially serving mobile station 110, and base stations 104 and 106 connected to the source base station via inter-base-station link segments 112 and 114, respectively. Another base station 108 is connected to the source base station via an inter-base-station link that includes inter-base-station-link segments 112 and 116. In addition, the cellular radio access system includes serving gateway 118, and base stations 102, 104, 106, and 108 are each communicatively linked via backhaul links 120, 122, 124, and 126 (respectively) to the serving gateway. It should be understood that, among other possible variations, the network may include additional (or fewer) mobile stations, base stations, serving gateways, links, and/or link segments.

Mobile station 110 may be any entity capable of carrying out the mobile-station functions described herein, and is further described with reference to FIG. 5. Likewise, base stations 102, 104, 106, and 108 may be any entities capable of carrying out the base-station functions described herein, and are further described with reference to FIG. 6.

Inter-base-station link segments 112, 114, and 116 and backhaul-link segments 120, 122, 124, and 126 may operate at one or more network layers of cellular radio access system 100. A link-layer (or physical-layer) link segment could be wired and/or wireless and could take the form of a coaxial cable, a fiber optic cable, an RF signal, and/or a copper wire, among numerous other examples. Links at one or more layers above the link layer (such as those listed in the example hierarchy of network layers provided below in Table 1) may carry Internet protocol (IP) packets, stream control transmission protocol (SCTP) packets, transmission control protocol (TCP) packets, user datagram protocol (UDP) packets (as examples), and/or packet-less communications. These higher-layer links may be carried over the link-layer of one or more inter-base-station and/or backhaul links.

TABLE 1

Application Layer
Radio Network Layer
Transport Layer
Internet Layer
Link Layer

It should be understood that the inter-base-station and backhaul links may operate at layers not explicitly described here, and those having skill in the art will understand that those layers are also within the scope of the claims.

III. Example Handoff Procedure

Figure 2:
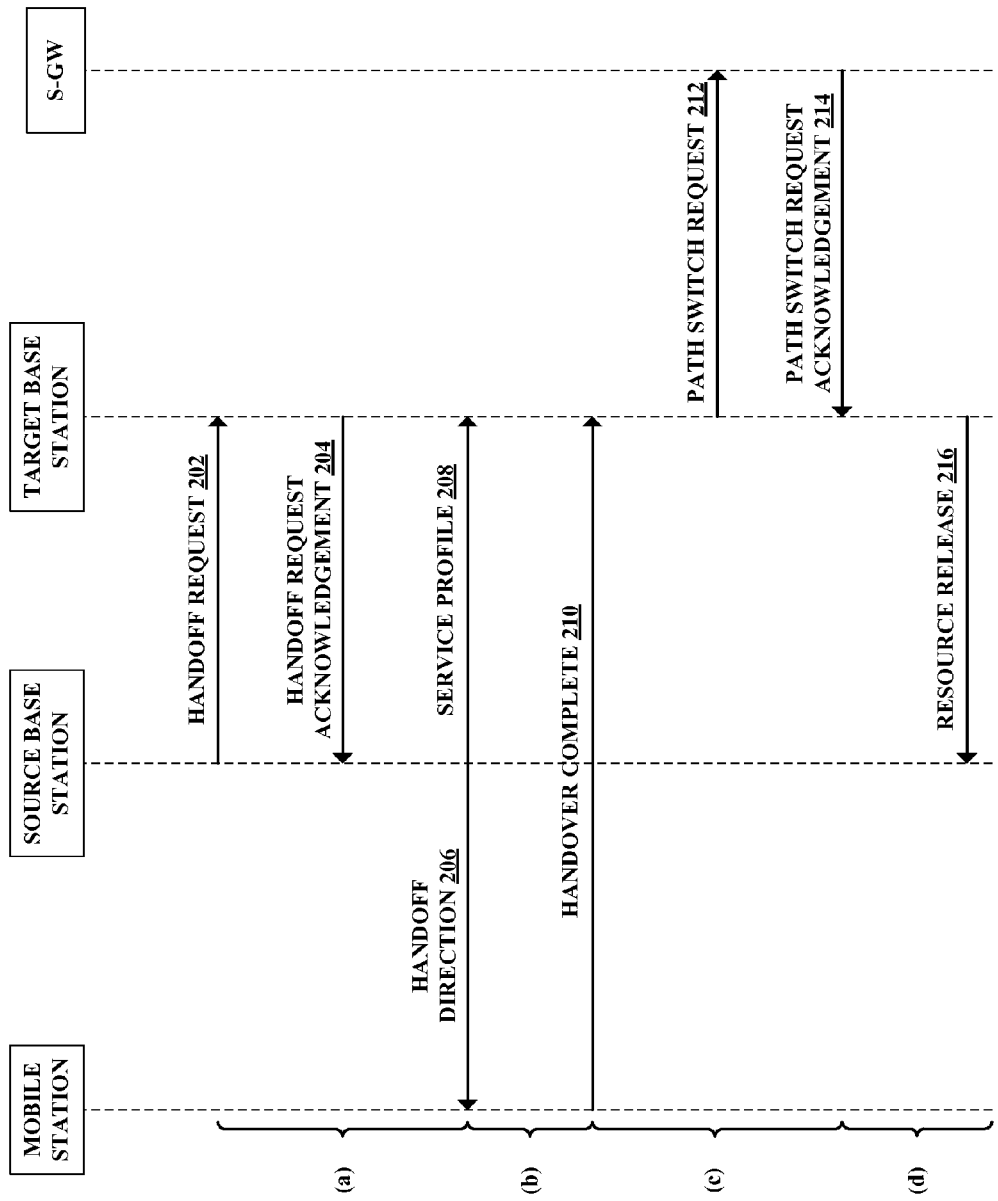
FIG. 2 is a sequence diagram of a handoff procedure, in accordance with at least one embodiment.

FIG. 2 is a sequence diagram of an example handoff procedure. As shown, a source base station (such as base station 102) sends a handoff-request message 202 to a target base station (such as base station 104), and the target base station responsively sends a handoff-request-acknowledgment message 204 to the source base station. While the messages exchanged between the source and target base stations are described here as being carried over an inter-base-station link, they could be carried over a backhaul link or any other type of link.

Upon receiving message 204, the source base station sends a handoff-direction message 206 to the mobile station (which could be mobile station 110) and service profile 208 to the target base station. Further, the source base station begins forwarding downstream bearer data to the target base station for forwarding to the mobile station, which sends a handoff-complete message 210 to the target base station after establishing an air-interface link with the target base station. Next, the target base station sends a path-switch-request message 212 to a serving gateway (such as S-GW) 118, which responsively sends a path-switch-request-acknowledgment message 214 to the target base station. Upon receiving that message, the target base station sends a resource-release message 116 to the source base station.

IV. Example Bearer Paths

FIG. 3 illustrates the upstream and downstream bearer data paths at or during times or periods (a)-(d) of FIG. 2.

At time (a), before source base station 102 sends the handoff-direction message 206 to the mobile station 110, upstream and downstream bearer data are exchanged between serving gateway 118 and the mobile station via the source base station.

At time (b), after source base station 102 sends the handoff-direction message 206 to mobile station 110, but before the mobile station establishes the air-interface link with the target base station, the target base station sends downstream bearer data from serving gateway 118 to both the mobile station (via an air-interface link between the mobile station and the source base station) and the target base station. Serving gateway 118 continues to receive upstream bearer data via source base station 102.

At time (c), after mobile station 110 establishes the air-interface link with the target base station, downstream bearer data is sent to source base station 102, then the target base station, and finally to mobile station 110. The serving gateway receives upstream bearer data via the target base station rather than source base station 102.

At time (d), after serving gateway 118 redirects the downstream bearer data to the target base station, upstream and downstream bearer data are exchanged between the serving gateway and mobile station 110 via the target base station.

As can be seen from FIGS. 2 and 3, congestion of an inter-base-station link between source base station 102 and the target base station may impact the handoff of mobile station 110, particularly during time (c). Such congestion could delay or even prevent the delivery of downstream bearer data to mobile station 110, which in turn could cause degraded call quality for the mobile station, or could even result in a call being dropped.

V. Example Method

Figure 4:
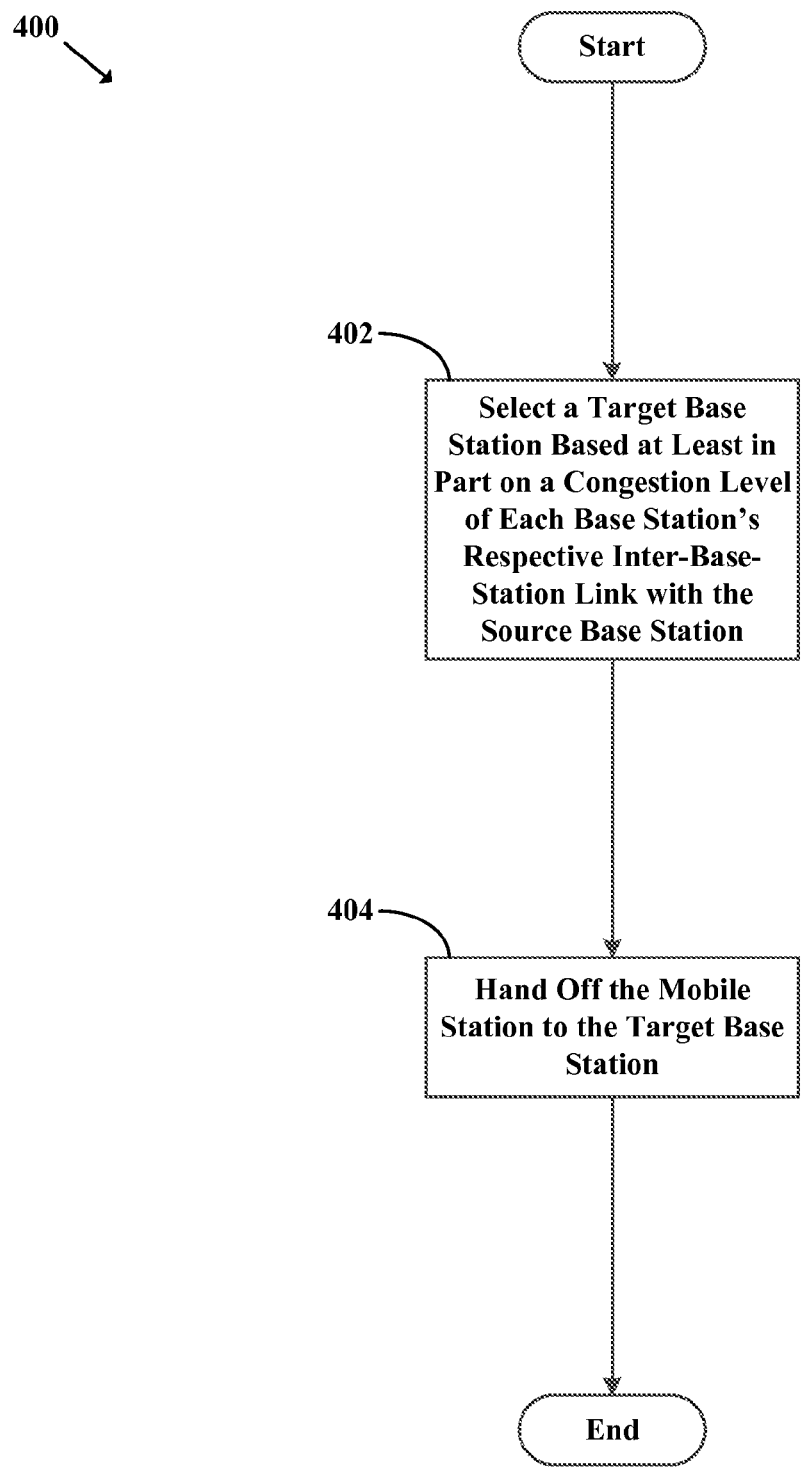
FIG. 4 is a flowchart of a method, in accordance with at least one embodiment.

FIG. 4 is a flowchart of a method 400, in accordance with at least one embodiment. As shown in FIG. 4, method 400 begins at step 402 with source base station 102 selecting a target base station from among base stations 104 and 106 based at least in part on the congestion levels of the base stations' respective inter-base-station links.

The congestion level could be a throughput of a respective inter-base-station link. In an embodiment, the throughput could be measured by the number of communications delivered via the inter-base-station link per unit time. Therefore, the throughput of a packet-switched network could be measured by the number of packets per second, packets per time slot, or bits per second (bit/s or bit rate), among other options. A higher throughput may correspond to a lower congestion level, while a lower throughput may correspond to a higher congestion level.

As another possibility, the congestion level could be a latency of the inter-base-station link. The latency could be measured by the time it takes for a packet or other communication sent from source base station 102 to reach a destination base station. A higher latency may correspond to a higher congestion level. Latency is different from throughput, and a low-throughput link could still have little latency; that is, the link may be able to deliver small amounts of data (low throughput) within a short period of time (low latency).

As yet another possibility, the congestion level could be a rate at which packets or other communications are corrupted and/or lost while carried by the inter-base-station link. These levels may be measured differently depending on network layer. For example, the target base station may detect (perhaps by using a checksum) that bits of a packet received via a link layer were corrupted, and may accordingly discard the packet, which therefore would not be passed to a higher network layer such as a transport layer. The same error could be measured by a corruption rate at the link layer and as a loss rate at the transport layer, as an example.

As still another possibility, the congestion level could be jitter, generally defined as a measure (in time) of the deviation from an average latency of the link. For example, the jitter of the link would be low if the latency of the link remained constant, even if the latency remained constantly high. A higher jitter may correspond to a higher congestion level. For instance, the selection of a bitrate or compression level for a given voice-data bearer communication may depend on the latency of the data. Selecting an appropriate bitrate or compression level could be difficult (or impossible) if the jitter of the inter-base-station link is high.

The congestion level could also be a rate at which (or extent to which) packets or other communications sent via the inter-base-station link are delivered out-of-order. Out-of-order packets received via a congested inter-base-station link may need to be stored at the target base station until the packets can be re-arranged for delivery to the mobile station. Delay in delivery of voice bearer-data communication could result in poor call quality.

Source base station 102 could select the target base station based on a combination of congestion levels of a respective inter-base-station link. For example, inter-base-station links 112 and 114 of base stations 104 and 106 (respectively) could both have a low latency (1 ms) and no packet loss, while link 114 could have a slightly higher latency (9 ms) than link 112 (2 ms), as shown in Table 2 below. In this instance, source base station 102 may select base station 104 as the target base station since both links 112 and 114 have the same level of jitter and packet loss but link 112 has a slightly lower latency than link 114.

TABLE 2

|  | Latency | Packet Loss | Jitter |
| --- | --- | --- | --- |
| Base Station 104 | 2 ms | 0% | 1 ms |
| Base Station 106 | 9 ms | 0% | 1 ms |

As another example, inter-base-station link 112 could have a relatively low latency (2 ms) but a relatively high jitter (7 ms), while link 114 could have a relatively low jitter (2 ms) but a relatively high latency (7 ms), as shown in Table 3 below. Source base station 102 could be arranged to prefer consistency to speed, and could accordingly select base station 106 as the target base station (given the lower jitter of inter-base-station link 112). Conversely, base station 102 could be arranged to prefer speed to consistency, and could accordingly select base station 104 as the target base station (given the lower latency of inter-base-station link 114).

TABLE 3

|  | Latency | Packet Loss | Jitter |
| --- | --- | --- | --- |
| Base Station 104 | 2 ms | 0% | 7 ms |
| Base Station 106 | 7 ms | 0% | 2 ms |

In an embodiment, source base station 102 could select the target base station based at least in part on the congestion levels of both the base stations' respective inter-base-station links and backhaul links. For example, inter-base-station link segments 112 and 114 could have relatively high latencies while backhaul-link segments 120, 122, and 124 could have relatively low latencies, as shown in Table 4 below. In this example, the latencies of backhaul-link segments 120 and 122 are 3 ms and 4 ms, respectively, and thus the maximum latency of these link segments (which together make up the backhaul link between source base station 102 and 104) is 4 ms. Similarly, the latencies of backhaul link segments 120 and 124 are 3 ms and 3 ms, respectively, and thus the maximum latency of these link segments (which together make up the backhaul link between source base station 102 and 106) is 3 ms.

TABLE 4

|  | Backhaul Segment 120 | Inter-base-station Segment 112 | Backhaul Segment 122 | Inter-base-station Segment 114 | Backhaul Segment 124 |
| --- | --- | --- | --- | --- | --- |
| Base Station 104 | 3 ms | 35 ms | 4 ms |  |  |
| Base Station 106 |  |  |  | 55 ms | 3 ms |

In this instance, source base station 102 may select base station 106 as the target base station because the lowest latency link among all the inter-base-station and backhaul links is the backhaul link between the source base station and base station 106.

In an embodiment, source base station 102 selects the target base station from among base stations 104 and 106 based at least in part on one or more factors in addition to the congestion level of the base stations' respective inter-base-station links. For example, as shown in Table 5 below, the combination of congestion levels (e.g., latency, packet loss, and jitter) of the respective inter-base-station links of base stations 104 and 106 may be identical while the average signal-to-noise ratio of the air-interface links of base station 104 may be lower than that of base station 106. In this instance, source base station 102 may select base station 106 as the target base station because its average signal-to-noise ratio is higher.

TABLE 5

|  | Latency | Packet Loss | Jitter | Signal-to-Noise Ratio |
| --- | --- | --- | --- | --- |
| Base Station 104 | 2 ms | 0% | 1 ms | 0.75 db |
| Base Station 106 | 2 ms | 0% | 1 ms | 2 db |

In an embodiment, source base station 102 selects the target base station from among base stations 104, 106, and 108 based at least in part on the congestion level of each inter-base-station link segment of the base stations' respective inter-base-station links. For example, as shown in Table 5, inter-base-station link segments 112 and 116 have a relatively lower latency (7 ms) than that of inter-base-station link segment 114 (55 ms). Further, the average latency of the inter-base-station link between source base station 102 and base station 104 is 7 ms, while the average latency of the inter-base-station link between source base station 102 and base station 108 is only 4.5 ms. Accordingly, source base station 102 could select base station 108 as the target base station because that target base station has the lowest average latency.

TABLE 6

| | Inter-base-station Segment 112 | Inter-base-station Segment 114 | Inter-base-station Segment 116 | Average Latency |
|---|---|---|---|---|
| Base Station 104 | 7 ms | | | 7 ms |
| Base Station 106 | | 55 ms | | 55 ms |
| Base Station 108 | 7 ms | | 2 ms | 4.5 ms |

In an embodiment, source base station 102 selects the target base station in response to detecting a trigger to handoff mobile station 110. The trigger could be a determination, a request, and/or an instruction by source base station 102, mobile station 110, serving gateway 118, and/or any other entity, among numerous other examples of possible triggering events.

At step 404, source base station 102 hands off mobile station 110 to the target base station. The handoff procedure may take the form of the handoff procedure described above, among other possibilities.

Though method 400 is described as being performed by a source base station, those having skill in the art will recognize that the method may be performed by other entities such as a mobile station, a target or other base station, and/or a serving gateway, among numerous other examples, including combinations of two or more such entities.

VI. Example Mobile Station

Figure 5:
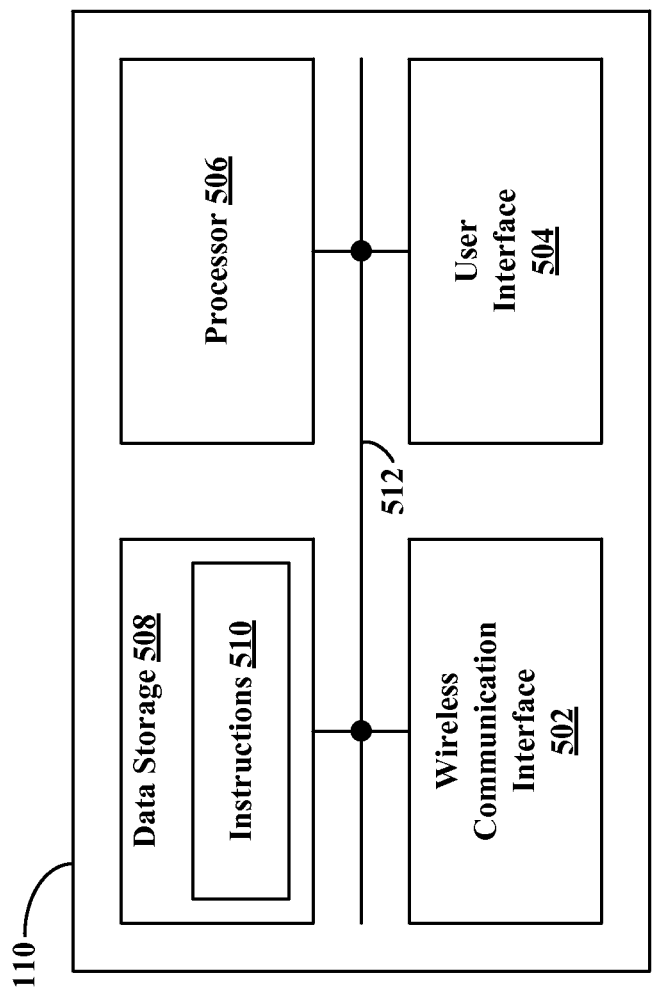
FIG. 5 is a simplified block diagram of an example mobile station that could be used in accordance with at least one embodiment.

FIG. 5 is a simplified block diagram of an example mobile station such as mobile station 110. As shown, the mobile station may include a wireless communication interface 502, a user interface 504, a processor 506, and data storage 508, all of which may be linked by a system bus, network, or other connection mechanism 512.

Wireless communication interface 502 may include an antenna arrangement and associated components such as a mobile-station modem (for example) for engaging in communication with any of base station 102, 104, 106, and/or 108. The wireless communication interface 502 may transmit control data and/or bearer data to the base stations and receive control data and/or bearer data from the base stations, as examples. User interface 504 may facilitate interaction with a user of the mobile station (if applicable) and may thus include output components such as a display screen, loudspeaker, and headphone jack, and input components such as a keypad, a touch-sensitive screen, and a camera, among other possibilities.

Processor 506 may take the form of one or more general-purpose processors and/or special-purpose processors, and may be integrated in whole or in part with wireless communication interface 502. Data storage 508 may comprise one or more volatile and/or non-volatile storage components (such as magnetic, optical, flash or other non-transitory storage) and may be integrated in whole or in part with processor 506. Further, the data storage 508 may store program instructions 510 that are executable by processor 506 for causing mobile station 110 to carry out various mobile-station functions described herein (such as method 400).

VII. Example Base Station

Figure 6:
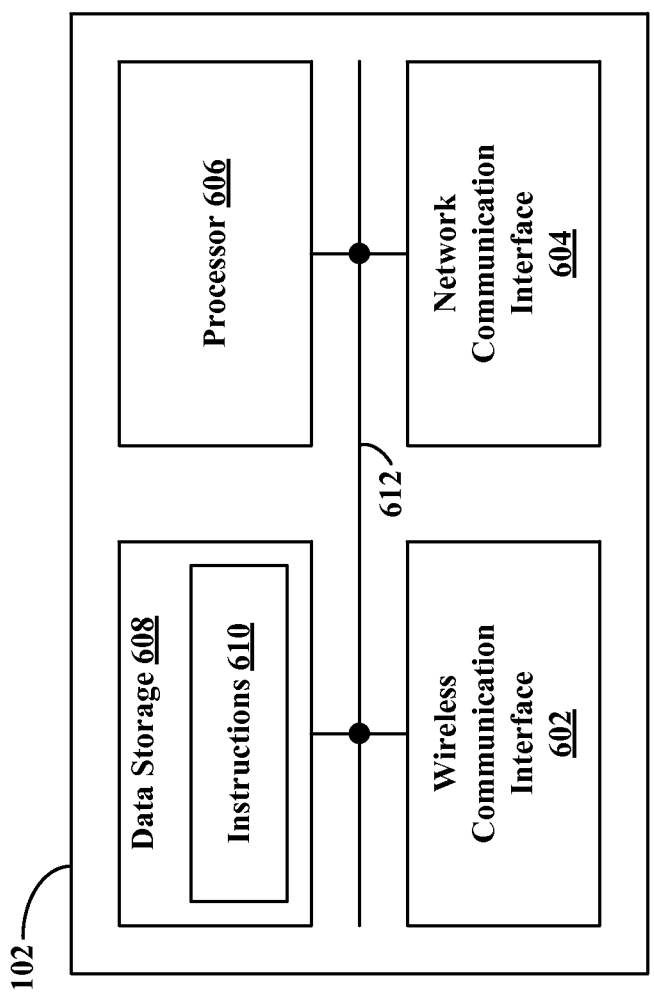
FIG. 6 is a simplified block diagram of an example base station that could be used in accordance with at least one embodiment.

FIG. 6 is a simplified block diagram of an example base station (such as source base station 102). As shown, the base station includes a wireless communication interface 602, a network communication interface 604, a processing unit 606, and data storage 608, all of which may be linked by a system bus, network, or other communication mechanism 612. Wireless communication interface 602, processor 606, data storage 608, and system bus 612 may function as described above with reference to FIG. 5. Network communication interface 604 may function to facilitate communication with other base stations and/or various network entities via an inter-base-station link and/or backhaul link (as examples). Data storage 608 may store program instructions 610 that are executable by processor 606 for causing the base station to carry out various base-station functions described herein (such as method 400).

VIII. Conclusion

Various example embodiments have been described above. Those of ordinary skill in the art will appreciate, however, that changes from the embodiments are possible while remaining within the scope of the claims.

We claim:

1. A method comprising:
   detecting by a source base station a trigger for handing off a mobile station that is currently served by the source base station;
   responsive to the detecting the trigger, the source base station selecting a target base station from among a plurality of first base stations, wherein each first base station is communicatively linked via a respective inter-base-station link with the source base station, and wherein selecting the target base station is based at least in part on consideration of a congestion level of each first base station's respective inter-base-station link; and
   handing off the mobile station to the selected target base station.

2. The method of claim 1, wherein the congestion level is selected from the group consisting of a throughput, a latency, a packet-corruption rate, a packet-loss rate, a jitter, and an out-of-order packet delivery rate.

3. The method of claim 1, wherein each respective inter-base-station link is selected from a group consisting of a link-layer link, an Internet-layer link, a transport-layer link, a radio network-layer link, and an application-layer link.

4. The method of claim 3, wherein the radio network-layer link comprises an X2 link.

5. The method of claim 1, wherein each inter-base-station link comprises at least one inter-base-station link segment, and wherein selecting the target base station based on the congestion level of each first base station's respective inter-base-station link comprises selecting the target base station based at least in part on a congestion level of each inter-base-station link segment.

6. The method of claim 1, wherein handing off the mobile station to the selected target base station comprises the source base station sending a service profile of the mobile station to the selected target base station via the selected target base station's respective inter-base-station link.

7. The method of claim 1, wherein handing off the mobile station to the selected target base station comprises:
   the source base station sending downstream bearer data to the selected target base station via the selected target base station's respective inter-base-station link; and
   the selected target base station receiving the downstream bearer data sent via the selected target base station's inter-base-station link and sending the received downstream bearer data to the mobile station.

8. A computing device comprising:
   a processor; and data storage comprising instructions executable by the processor for causing the computing device to carry out a set of functions, wherein the set of functions includes (i) detecting a trigger for handing off a mobile station that is currently served by a source base station, (ii) responsive to detecting the trigger, selecting a target base station from among a plurality of first base stations, wherein each first base station is communicatively linked via a respective inter-base-station link with the source base station, and wherein the target base station is selected based at least in part on consideration of a congestion level of each first base station's respective inter-base-station link, and (iii) handing off the mobile station to the selected target base station, and wherein the computing device is the source base station.

9. The computing device of claim 8, wherein the congestion level is selected from a group consisting of a throughput, a latency, a packet-corruption rate, a packet-loss rate, a jitter, and an out-of-order packet delivery rate.

10. The computing device of claim 8, wherein the respective inter-base-station link is selected from the group consisting of a link-layer link, an Internet-layer link, a transport-layer link, a radio network-layer link, and an application-layer link.

11. The computing device of claim 10, wherein the radio network-layer link comprises an X2 link.

12. The computing device of claim 8, wherein the inter-base-station link comprises at least one inter-base-station link segment, and wherein selecting the target base station based on the congestion level of each first base station's respective inter-base-station link comprises selecting the target base station based at least in part on a congestion level of each inter-base-station link segment.

13. The computing device of claim 8, wherein handing off the mobile station to the selected target base station comprises sending a service profile of the mobile station from the source base station to the selected target base station via the selected target base station's respective inter-base-station link.

14. The computing device of claim 8, wherein handing off the mobile station to the target base station comprises:

sending downstream bearer data from the source base station to the selected target base station via the selected target base station's respective inter-base-station link; and receiving the sent downstream bearer data at the selected target base station via the selected target base station's respective inter-base-station link, and forwarding the received downstream bearer data from the selected target base station to the mobile station.

* * * * *